3,092,684
SONIC SIMULATOR
Burton L. Frankel, Beachwood, Ohio, assignor, by mesne assignments, to the United States of America as represented by the Secretary of the Navy
Filed Apr. 12, 1960, Ser. No. 21,844
2 Claims. (Cl. 35—10.4)

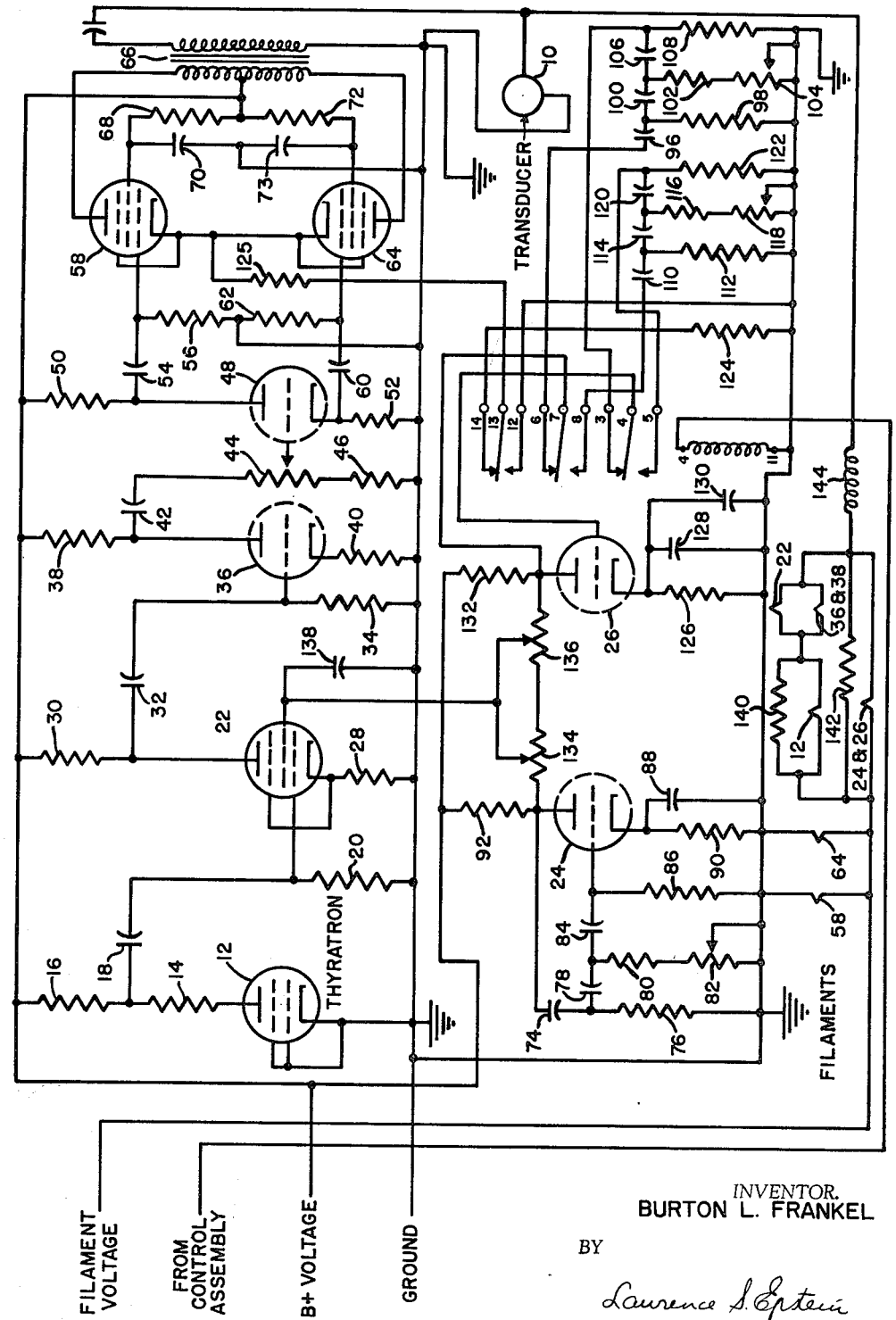

This invention relates to a noise producing device and is intended for use with the submarine decoy which is described in a co-pending application of Otto Christopher Niederer, filed January 31, 1961, Serial No. 84,467. The U.S. Government as represented by the Secretary of the Navy is a common assignee of the instant application and the above referenced copending application. This noise device will provide accoustical energy in the water which closely approximates the accoustical energy developed by a moving submarine.

In training personnel in the detection and recognition of submarines, it is required to realistically simulate the noise signature of different submarines. Previous methods of simulating noise have failed in regard to realism because they did not include a changing pattern of the sonic output with time as encountered with the actual sonic outputs of submarines. This characteristic is commonly referred to as a "chugging" noise and varies in frequency and magnitude with time. It occurs in the water as a varying, low-frequency beat which is superimposed over white noise. Since realistic simulation is vital for both training and decoying, all characteristics of submarine noise must be included in the simulating device. This invention overcomes the deficiencies of the prior art in the realistic reproduction of noise that will train personnel to recognize the actual submarine noises produced by operational equipment. This is obtained by varying the noise in frequency and magnitude with time.

It is an object of this invention to provide an improved noise simulator for use in underwater submarine simulators.

A further object of this invention is to provide an all electronic noise simulator which will realistically produce the noise signature of different types of submarines.

Another object of this invention is to provide a noise simulator which varies the noise in frequency and magnitude with time.

Other objects and many of the attendant advantages of this invention will be readily appreciated as the same becomes better understood by reference to the following detailed description when considered in connection with the accompanying drawing wherein the FIGURE is an electrical schematic diagram of the electronic circuits which produce the noise, control means for controlling the noise and a representation of the transducer.

As shown in the figure, the sonic simulator comprises an electronic chassis for producing and controlling the noise and a magnetostrictive type of transducer 10. The noise generated is not a true signature for any specific submarine; however, adjustments are provided for approximating the noise of a variety of types of submarines. Amplitude and frequency changes typical of the sounds encountered in submarines running at 4 knots and 10 knots are produced as a function of speed changes in the device.

As shown on the figure, random noise is generated by the diode connected thyratron 12. This thyratron is operating class A with resistors 14 and 16 forming its plate load. Part of the output from the plate of thyratron 12 is applied through capacitor 18 and across grid resistor 20 to pentode mixer tube 22. This pentode mixer tube operates to modulate the noise output of the thyratron 12 with the frequencies generated by the phase-shift oscillators 24 and 26 to provide the characteristic chugging noise of a submarine. Resistor 28 is the cathode load for mixer 22 and resistor 30 is the plate load for mixer 22. The modulating signal is applied to the screen grid of mixer 22. The modulated noise signal output from mixer 22 is applied through capacitor 32 and across grid resistor 34 to the grid of amplifier tube 36. Resistor 38 is the plate load for amplifier 36 and resistor 40 is the cathode load for amplifier 36. The modulated noise output from amplifier 36 is applied through capacitor 42 across grid resistors 44 and 46 to the grid of the phase-splitter tube 48. Tube 48 has equal plate and cathode load resistors 50 and 52 respectively. Modulated noise output from the plate of phase-splitter 48 is applied through capacitor 54 and across grid resistor 56 to the grid of one-half of the push-pull output 58. The output from the cathode of tube 48 which is 180 degrees out of phase with the output from the plate of this tube is applied to capacitor 60 across grid resistor 62 to the grid of the other half of push-pull circuit 64. Tubes 58 and 64 and transformer 66 form a push-pull output for the modulated noise signals applied to their grids. The output from transformer 66 is applied to the sonic transducer 10. Resistor 68 and capacitor 70 form a screen grid decoupling network for tube 58. Resistor 72 and capacitor 73 form a screen grid decoupling network for tube 64.

Tht magnitude of the sonic output applied to transducer 10 can be varied by utilization of level control 44.

Phase-shift oscillator 24 operates at a single frequency with plate to grid feedback being provided through a phase-shift network comprising capacitor 74, resistor 76, capacitor 78, resistors 80 and 82, capacitor 84 and resistor 86. The frequency of oscillation can be varied over a small range by means of variable resistor 82. Capacitor 88 and resistor 90 form the cathode load for the phase-shift oscillator 24. Resistor 92 is the plate load for phase-shift oscillator 24. Phase-shift oscillator 26 operates at one of two different frequencies depending upon the phase-shift circuit that is switched into the oscillator circuit by means of relay 94. Relay 94 is controlled externally from a control assembly and operates to a position which determines the operating frequency of phase-shift oscillator 26 for simulation of different submarine noise. When relay 94 is de-energized, the phase-shift circuit for plate to grid feedback for phase-shift tube 26 comprises capacitor 96, resistor 98, capacitor 100, resistors 102 and 104, capacitor 106 and resistor 108. When relay 94 is energized, the phase-shift circuit for plate to grid feedback of phase-shift oscillator 26 comprises capacitor 110, resistor 112, capacitor 114, resistors 116 and 118, capacitor 120 and resistor 122. With relay 94 de-energized, resistor 124 is added to the cathode load resistor 125 of push-pull stages 58 and 64 thereby decreasing the output stage gain. When relay 94 is energized, resistor 124 is removed from the cathode load of the output stage and the output stage gain is thereby increased. Resistor 126 and capacitors 128 and 130 form the cathode load for phase-shift oscillator 26. Resistor 132 forms the plate load for phase-shift oscillator 26. The plate outputs from phase-shift oscillators 24 and 26 are combined across variable potentiometers 134 and 136 and applied to the screen grid of mixer tube 22. Capacitor 138 is a decoupling path for the screen grid of mixer tube 22. The phase-shift oscillators and their associated phase-shift sections will function together to produce the proper varying beat note which modulates the white-noise output of thyratron 12. Variable resistors 82, 104 and 118 are utilized to adjust the frequencies of their respective oscillator circuits. By adjusting these frequencies so that they are not exact multiples of each other, it is possible to obtain the characteristic varying beat note which when combined with the white-noise gives the realistic simulated submarine noise. Resistors 140 and 142 are in the filament circuits for the tubes and function to maintain regulated noise-free filament voltage. Inductor 144 provides optimum bias for transducer 10.

The operation on the sonic simulator is as follows: The white-noise generated by the thyratron 12 is applied to the modulator-mixer tube 22. The phase-shift oscillators 24 and 26 are generating two different frequencies which are mixed and applied to mixer tube 22 for modulation of the white noise. The operating frequencies of the phase-shift oscillators are chosen to provide the characteristic chugging noise of a submarine at the output of the mixer tube 22. The simulated submarine noise is then amplified and applied to sonic transducer 10. The sonic transducer converts the electrical noise to wavefronts traveling through the water in simulation of the noise produced by a submarine.

Obviously, many modifications and variations of the present invention are possible in the light of the above teachings. It is therefore to be understood that within the scope of the appended claims the invention may be practiced otherwise than as specifically described.

What I claim is:

1. An underwater decoy noise simulator comprising a noise source operatively connected to mixing means, said mixing means being operatively connected to amplifying means and to an underwater sonic transducer, oscillator means operatively connected to said mixing means for modulation of said noise source output whereby said underwater sonic transducer simulates the noise of a submarine, said oscillator means comprising two different oscillators whose outputs are mixed together, said oscillators being interconnected with phase-shift means, whereby oscillations are sustained, one of said oscillators operating at a fixed frequency, the other oscillator operating at one of two different frequencies, and control means operatively connected to said second oscillator and said phase-shift means for said second oscillator wherein said control means can vary said phase-shift means for said second oscillator for a corresponding operating frequency change.

2. The combination of claim 1 and control means operatively connected to each of said phase-shift means of each of said oscillators whereby the operating frequency of said oscillators can be varied.

References Cited in the file of this patent

UNITED STATES PATENTS

| | | |
|---|---|---|
| 2,445,712 | Forbes | July 20, 1948 |
| 2,491,020 | Winchel | Dec. 13, 1949 |
| 2,521,405 | Phelps | Sept. 5, 1950 |
| 2,713,729 | Springer | July 26, 1955 |
| 2,838,850 | Stephenson et al. | June 17, 1958 |
| 2,881,535 | Harwood et al. | Apr. 14, 1959 |
| 2,887,671 | Frankel et al. | May 19, 1959 |
| 2,898,587 | Nye | Aug. 4, 1959 |
| 2,974,424 | Roberts | Mar. 14, 1961 |
| 2,975,396 | Mueller | Mar. 14, 1961 |

OTHER REFERENCES

"Audio Magazine," January 1960 (page 19, column 3 (bottom) and figure relied on).